Feb. 18, 1941.   E. W. GRIFFITH   2,232,447
SIGNAL OPERATING MECHANISM FOR MOTOR VEHICLES
Filed April 17, 1939
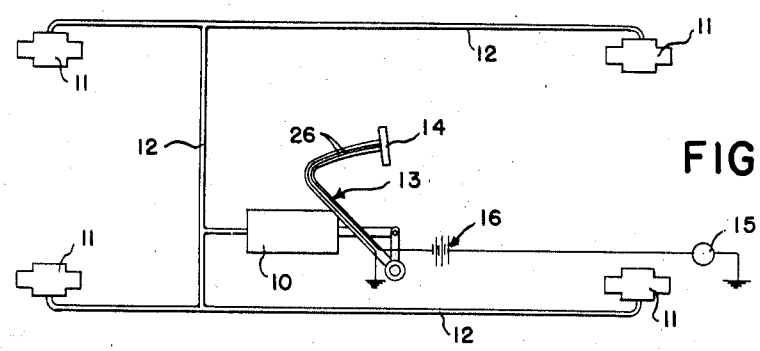
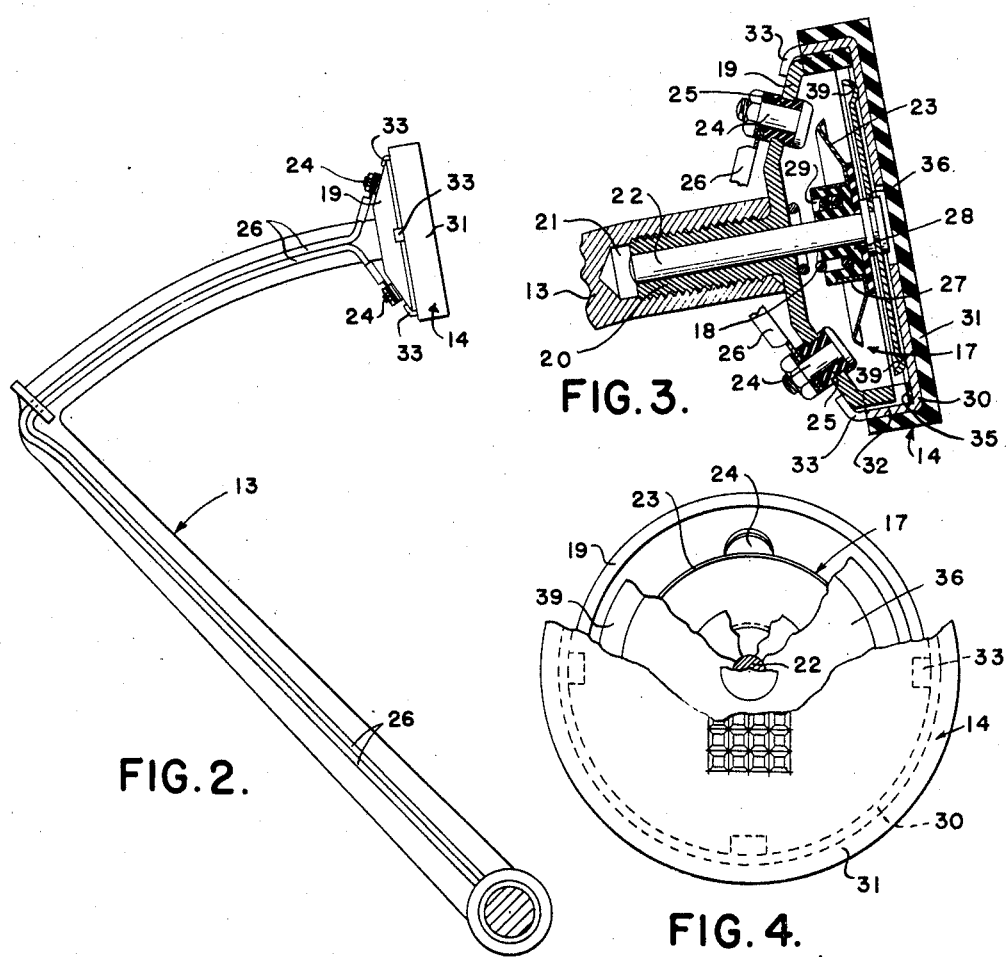
INVENTOR.
EDWARD W. GRIFFITH
BY
ATTORNEYS Patented Feb. 18, 1941

2,232,447

UNITED STATES PATENT OFFICE 2,232,447

SIGNAL OPERATING MECHANISM FOR MOTOR VEHICLES

Edward W. Griffith, Detroit, Mich.

Application April 17, 1939, Serial No. 268,365

1 Claim. (Cl. 200—59)

This invention relates to improvements in the mechanism provided for automatically operating a vehicle signal in dependence upon manipulation of one of the vehicle controls and refers more particularly to an improved stop light switch rendered operative upon applying pressure on the brake operating control element.

Heretofore two distinct types of mechanisms have been used extensively to operate motor vehicle stop signals upon manipulation of the brake control pedal. One of the above types may be generally described as mechanically operated, and the other as fluid or hydraulically operated. The fluid or hydraulically actuated type has been used in combination with fluid braking systems for actuation by the pressure of the braking fluid flowing to the brake applying means and has proved objectionable in that it not only introduces another instrumentality in the fluid circuit where a leak may develop but, in addition, is difficult to calibrate or adjust so that the signal will be operated in proper timed relation to application of the brakes, irrespective of the condition of the braking system. The mechanical type of signal operating mechanism has been used with both fluid and mechanically operated brake systems. In either case, the mechanical type effects operation of the signal in dependence upon pedal travel and difficulty has been encountered with this type in effecting operation of the signal at the proper time regardless of the adjustment of the brakes or the travel of the pedal necessary to apply the brakes.

It is one of the principal objects of this invention to provide a signal operating mechanism which not only renders it possible to eliminate all of the foregoing objections but, in addition, is capable of being manufactured, assembled and installed at a cost comparable to the less efficient installations previously referred to.

One of the objects of this invention which contributes materially to minimizing the liability of a leak developing in a hydraulic brake system consists in providing a mechanically actuated signal mechanism operable independently of the braking fluid in the system to effect operation of the signal.

Another object of the present invention resides in the provision of a mechanically actuated signal capable of being advantageously used in association with a mechanical braking system and having provision for effecting operation of the signal at the proper time independently of the pedal travel.

Another advantageous feature of this invention resides in the provision of signal actuating mechanism which will effect operation of the signal to give the desired warning at the proper time interval, irrespective of the fluid pressure in the hydraulic system and regardless of the pedal travel required in applying brakes in either the mechanical or hydraulic systems.

A further feature of this invention consists in the provision of signal control mechanism carried by the brake operating pedal in a manner to insure operation of the control mechanism by the foot of the operator regardless of the position of the foot with respect to the pedal pad and irrespective of the direction of application of the foot pressure on the pedal pad.

The foregoing, as well as other objects, will be made more apparent as this description proceeds, especially when considered in connection with the accompanying drawing, wherein—

Figure 1 is a diagrammatic view illustrating one type of brake system to which my improved signal operating mechanism is applicable;

Figure 2 is a side elevational view of a brake pedal equipped with signal operating mechanism constructed in accordance with this invention;

Figure 3 is an enlarged cross sectional view through the pedal pad illustrating my improved signal operating mechanism;

Figure 4 is a plan view of the pedal pad having certain parts broken away for the sake of clearness.

Although it will be apparent from the following detailed description that my improved signal operating mechanism may be used with equal facility in association with either a mechanical or hydraulic brake system, nevertheless, I have selected a hydraulic brake system for the purpose of illustration. In Figure 1 of the drawing, I have illustrated a typical hydraulic brake system comprising a master cylinder 10 for applying pressure to the braking fluid, a plurality of brake cylinders 11 for transferring the pressure of the fluid to the brake friction means (not shown), and conduits 12 connecting the master cylinder 10 with the brake cylinders 11. In accordance with conventional practice, pressure is built up in the master cylinder 10 by a brake pedal 13 having a foot engaging pad 14 responsive to the application of foot pressure to operate a signal, such as a stop light 15. The stop light 15 is connected in an electric circuit 16 including a switch 17 operated by the foot pressure applied to the pedal pad 14, irrespective of the pressure built up in the master cylinder 10 and regardless of the angular travel of the pedal 13. As will be more fully hereinafter set forth, the switch is normally maintained in its open position by means of a spring 18, and this spring is carefully calibrated to insure closing of the circuit 16 to the stop light 15 upon the application of a predetermined desired foot pressure which, of course, is entirely independent of the fluid pressure in the system or the extent of angular travel of the pedal 13.

Upon reference to Figures 2 and 3, it will be noted that the switch 17 is embodied in the pedal pad 14 and provision is made to insure operation of the switch to close the circuit 16 to the signal 15 regardless of the portion of the pedal pad engaged by the operator's foot, or the direction in which force is applied to the pedal. In other words, with the above arrangement, the operator is not required to engage the pedal pad 14 in any particular place in order to effect operation of the switch and this is, of course, desirable in that often times only a relatively small area of one side portion of the pedal is engaged to effect brake application. In detail, the pedal pad 14 comprises a cup-shaped housing 19 having a hub 20 extending axially from the base of the housing and threaded into a tapped bore 21 formed in the upper end of the pedal 13. The hub 20 is axially bored to slidably receive a rod 22 having an electrical contact disc 23 secured thereto adjacent the outer end thereof and positioned within the cup-shaped housing 19. Cooperating with the contact disc 23 is a pair of stationary electrical contacts 24 secured to the base of the cup-shaped housing 19 in a position to be engaged by the periphery of the disc 23 as the rod 22 is moved inwardly from the position thereof shown in Figure 3. The stationary contacts 24 are secured to the base of the cup-shaped housing 19 through the medium of bushings 25 of insulating material and portions of the contacts project beyond the base of the housing 19 for connection with suitable electrical conductors 26 which, in turn, are connected in the circuit 16 in such a manner that engagement of either stationary contact with the movable contact disc 23 closes the circuit to the signal 15.

The movable contact disc 23 is shown in Figure 3 as having an axially extending hub 27 pressed on a block of insulating material 28 which, in turn, is secured to the rod 22. The inner end portion of the block of insulating material 28 is fashioned with an annular groove 29 adapted to receive the upper end of the spring 18 to secure the spring in position. The spring 18 surrounds the rod 22 and the lower end of the spring abuts the base of the housing 19 with the result that the spring acts upon the movable contact 23 to normally maintain the latter out of engagement with the cooperating stationary contacts 24. As indicated above, the spring 18 is carefully calibrated to require the application of a predetermined pedal pressure on the pad 14 before the switch 17 is closed to operate the stop light signal 15. As a result, practically any ratio between the pressure in the hydraulic braking system and the pressure required to operate the stop light 15 may be provided by merely selecting a spring of the proper strength.

The outer end of the cup-shaped housing 19 is closed by means of a cap 30 having a rubber pad 31 vulcanized thereto and having an annular flange 32 telescopically engaging the annular flange of the cup-shaped housing 19. The flange 32 is provided with circumferentially spaced inwardly extending lugs 33 adapted to be bent radially inwardly in the manner shown in Figure 3 to engage the base of the cup-shaped member 19 and form a stop for limiting outward movement of the cap 30 relative to the housing 19. It will also be observed from Figure 3 that the annular flange of the housing 19 is provided with circumferentially spaced slots therein for receiving correspondingly spaced rubber lugs vulcanized to the cap 30 and effective to not only locate the cap on the member 19, but to also prevent rotation of the cap relative to the member 19. It will, of course, be understood that in the normal position of the parts shown in Figure 3, the cap 30 is spaced outwardly from the free edge of the annular flange on the cup-shaped member a distance somewhat greater than the extent of movement of the contact disc 23 required to engage the disc with the stationary contacts 24 and, in the present instance, a rubber ring 35 is vulcanized to the cap 30 opposite the edge of the annular flange on the cup-shaped member to cushion engagement of the closure with the cup-shaped housing upon applying pressure to the closure.

In order to insure operation of the contact disc 23, irrespective of the application of foot pressure on the pedal pad 14, I provide an actuating disc 36 located between the closure 30 and the switch contact disc 23. The disc 36 is centrally apertured to receive the outer end of the rod 22 and the latter is upset to effectively rivet the disc thereto. The diameter of the actuating disc approximates the internal diameter of the cup-shaped housing and is provided with an annular offset portion 39 at the periphery thereof arranged to contact with the adjacent surface of the closure cap 30. It follows from the above that the operating disc 36 is moved to effect a movement of the contact disc 23 into engagement with the stationary contacts regardless of the portion of the pedal pad 14 engaged by the operator's foot and irrespective of the direction of the pressure applied to the pedal pad 14.

Thus, from the foregoing, it will be observed that I have provided a signal control switch associated with the pedal pad of a brake pedal in such a manner that operation of the signal is insured, even though only a portion of the pedal pad is engaged by the operator's foot and regardless of the direction of pressure applied to the pad. It will also be noted that my improved mechanism renders it possible to operate the signal in dependence upon the application of a predetermined pedal pressure and this result is accomplished regardless of pedal travel or the pressure in the fluid braking system. It will further be noted that the mechanism is not only capable of being housed in a compact space but, in addition, may be inexpensively manufactured, assembled and installed.

What I claim as my invention is:

A motor vehicle control element comprising an enlargement at the upper end having an annular flange forming a housing and having an axially bored centrally disposed hub portion, electrical contact means carried by the enlargement, a member mounted in the hub for sliding movement relative to the enlargement and having the upper end extending into the housing, a switch contact member secured to the member in the housing for movement as a unit with the member into and out of engagement with the contact means aforesaid, spring means resisting movement of the switch contact element into engagement with the cooperating switch contact means, a cup-shaped closure telescopically engaging the annular flange on the enlargement and forming a foot engaging pedal pad for the control element, and an actuator for the switch contact element secured at its center to the slidable member and having portions engageable with the inner side of the cup-shaped closure whereby movement of the closure relative to the enlargement against the action of the spring means effects a corresponding movement of the slidable member to engage the switch contact element with the cooperating switch contact means.

EDWARD W. GRIFFITH.